(No Model.)
C. F. W. SCHRAMM.
BROOM AND SCOOP MECHANISM FOR EVAPORATING PANS.
No. 255,035. Patented Mar. 14, 1882.
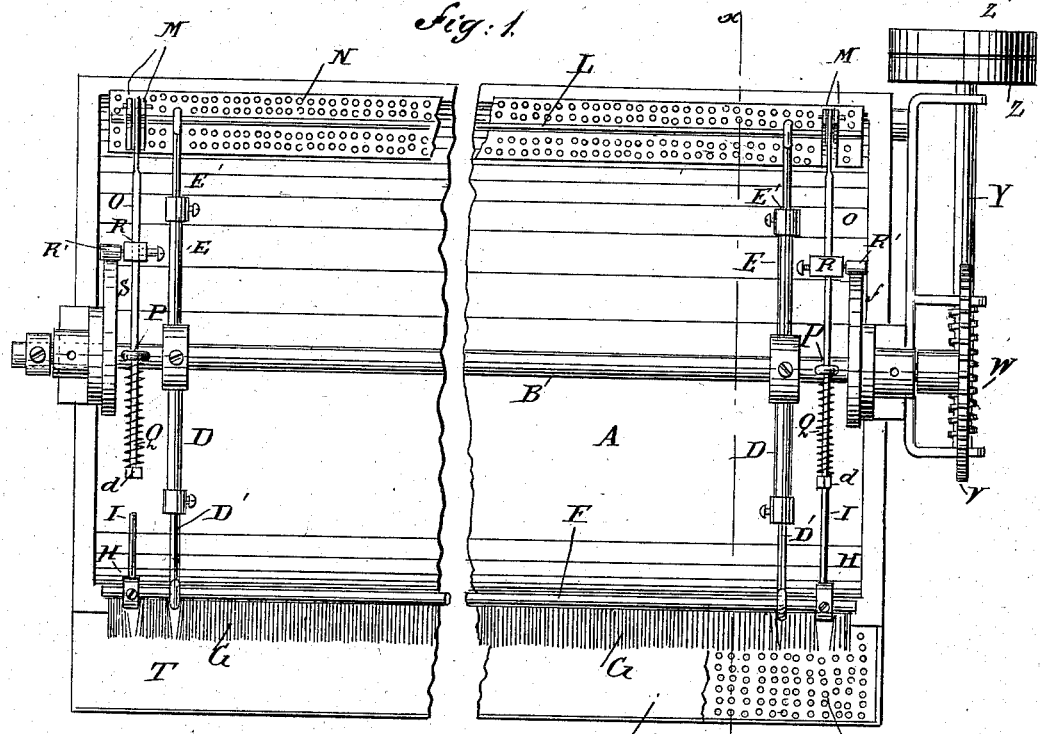
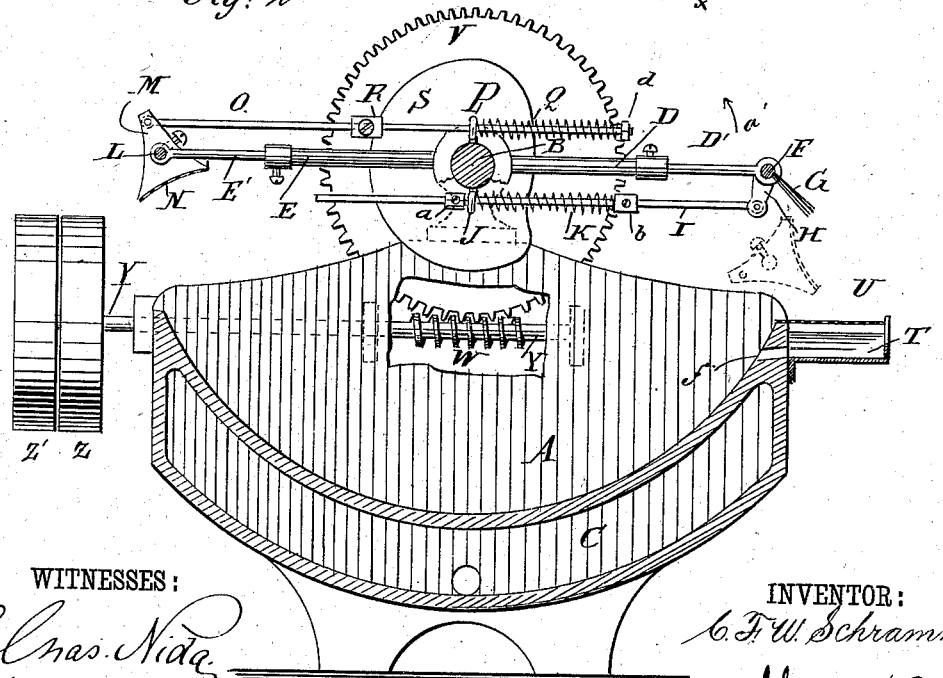
WITNESSES:
INVENTOR:
C. F. W. Schramm
BY Munn & Co.
ATTORNEYS.

UNITED STATES PATENT OFFICE.

CARL F. W. SCHRAMM, OF BROOKLYN, ASSIGNOR TO HIMSELF AND J. MONROE TAYLOR, OF NEW YORK, N. Y.

BROOM AND SCOOP MECHANISM FOR EVAPORATING-PANS.

SPECIFICATION forming part of Letters Patent No. 255,035, dated March 14, 1882.

Application filed January 13, 1882. (No model.)

*To all whom it may concern:*

Be it known that I, CARL F. W. SCHRAMM, of Brooklyn, in the county of Kings and State of New York, have invented a new and Improved Broom and Scoop Mechanism for Evaporating-Pans, of which the following is a full, clear, and exact description.

The object of my invention is to facilitate removing crystals and other solid matter from evaporating-pans, such as are used in the manufacture of soda and other substances.

The invention consists in a brush or scoop mounted on the ends of arms of a revolving shaft journaled above an evaporating-pan in such a manner that when the shaft revolves the brush and scoop will be caused to sweep over the interior surface of the pan and remove the solid matter on the bottom of the pan into a suitable receptacle that is arranged outside of the pan.

The invention further consists in devices for tilting the scoop automatically when the same has been raised above the pan, and also in devices for pressing the scoop and the brush upon the bottom or surface of the pan.

The invention also consists in certain details of construction, as will be fully described hereinafter.

Reference is to be had to the accompanying drawings, forming part of this specification, in which similar letters of reference indicate corresponding parts in both the figures.

Figure 1 is a plan view of an evaporating-pan provided with my improved broom and scoop. Fig. 2 is a cross-sectional elevation of the same on the line $x\ x$, Fig. 1.

The evaporating-pan A is made in the shape of a trough recessed on a segmental line, the center of the circle of which segmental line is the center of the shaft B, on which the brush and scoop, now to be described, are mounted. The pan A may be heated by steam in a jacket, C, below the pan, by steam-pipes, direct flame, or in any suitable manner. The ends of the pan are raised and carry journals for the shaft B, extending longitudinally and centrally over the pan. The shaft B is provided at the ends and, if the shaft is long, also between the ends with tubular arms D and E, extending in opposite directions and containing sliding rods D' and E', which can be locked to the tubular arms, at any desired projection from these arms, by binding-screws or equivalent devices at the ends of the arms.

In the ends of the rods D' D' a shaft, F, is journaled, which is provided throughout its length with a row of projecting bristles, G, all of the same length and made of steel or other metal wire, steel wire being preferred, as being most durable. At suitable intervals this shaft F is provided with a series of arms, H, all projecting in the same direction and of equal length.

To the end of each arm H a rod, I, is pivoted, which passes through a guide loop or ring, J, projecting from the shaft B, and directly beyond this loop or ring the rod I is provided with an adjustable check-block, $a$, for the purpose of checking the movement of the rod I.

Between the loop or ring J and the arm H the rod I is provided with another adjustable check-block, $b$, between which and the loop J a spiral spring, K, is coiled around the rod I, which spring presses the rod I in a direction from the shaft B. A shaft, L, is journaled in the ends of the rods E', and on the ends of this shaft L triangular plates or arms M are rigidly mounted, on the wider ends of which arms a slightly recessed or trough-shaped perforated scoop, N, extending throughout the entire length of the pan A, is mounted.

To the opposite end of each arm M a rod, O, is pivoted, which extends through a guide loop or ring, P, projecting from the shaft opposite the guide-loops J. A nut, $d$, is mounted on the outer end of each rod O, and between the loop P and the nut $d$ a spiral spring, Q, is coiled around the rod O, which spring draws the rod O in the direction toward the shaft B. Each rod O is provided between the arm M and loop P with an adjustable block, R, provided with a projection on which a sleeve, R', is loosely mounted, which sleeves rest on the edges of cam-plates S, mounted rigidly on the bearings of the shaft B at the ends of the pan. These cam-plates have a circular edge toward that longitudinal edge of the pan at which the scoop and brush enter the pan, and a flattened and recessed edge toward that longitudinal edge of the pan at which the scoop and brush leave the pan. At this latter longitudinal edge of the pan the same is provided with an outwardly-projecting longitudinal gutter, T, from the bottom of which a channel, f, leads into the pan. This gutter is provided with a perforated cover, U, flush with the upper edge of the pan. On one end of the shaft B a worm-wheel, V, is rigidly mounted, engaging with a worm, W, on a shaft, Y, provided with a fixed and a loose pulley, Z Z', respectively, for rotating the shaft B; but this shaft B can be rotated by any other suitable devices.

The operation is as follows: The rods E' are so adjusted that the outer edge of the scoop N will scrape along the surface of the pan when the shaft B revolves, and the rods D' are adjusted accordingly. The shaft B rotates in the direction of the arrow a'. The brush G brushes along the surface of the pan and loosens the crystals and granulated and solid matter that has collected on the surface or bottom of the pan, and carries some of this matter upon the perforated cover U of the gutter T. The brush-bristles are pressed against the curved surface or bottom of the pan by the springs K. When the brush G leaves the pan the scoop N enters and scrapes along the curved surface or bottom of the pan and loosens all the solid matter, carrying it up to the gutter T. The springs Q press the sleeves R' of the blocks R against the edges of the cam-plates S, thereby forcing the outer edge of the scoop N outward or from the shaft B. When the outer edge of the scoop has just passed the edge of the gutter T the sleeve R' has reached the recesses in the cam-plates S, and the springs Q suddenly draw the rods O a short distance toward the shaft B, whereby the outer edge of the scoop N will be suddenly moved a short distance farther from the shaft B, as shown in dotted lines in Fig. 2, and thereby the contents of the scoop will be thrown upon the perforated cover U of the gutter T. Then the brush G again enters the pan, and so on; or the apparatus is stopped until more crystals or solid matter has collected on the bottom or surface of the pan. As the scoop N is perforated, most of the liquid can flow off while the scoop is leaving the liquid in the pan. The remaining liquid flows from the crystals or solid matter through the perforations of the cover U into the gutter T, and from the same back into the pan. The perforated cover U can be constructed as an endless conveyer, which carries off the crystals and other matter as fast as they are deposited. The scoop and brush are pressed against the inner surface of the pan by a yielding pressure, whereby injury to the scoop, brush, or pan is avoided.

Having thus fully described my invention, what I claim as new, and desire to secure by Letters Patent, is—

1. A brush and scoop for evaporating-pans, made substantially as herein shown and described, and consisting of a brush and scoop mounted on arms of a revolving shaft, and adapted to sweep upon and clear the surface of the pan, as set forth.

2. The combination, with the brush and scoop, of devices for pressing the brush and scoop with a yielding pressure against the surface of the pan, substantially as herein shown and described, and for the purpose set forth.

3. The combination, with the evaporating-pan A, of the shaft B, provided with arms D and E, the shafts F and L, and the scoop N and brush G, substantially as herein shown and described, and for the purpose set forth.

4. The combination, with the evaporating-pan A, of the shaft B, provided with arms E, the scoop N, mounted on the ends of these arms, and of devices for tilting this scoop automatically, substantially as herein shown and described, and for the purpose set forth.

5. The combination, with the evaporating-pan A, of the shaft B, provided with arms D and E, the brush G, and the scoop N, mounted on these arms, respectively, and of devices for pressing the scoop and brush upon the surface or bottom of the pan, substantially as herein shown and described, and for the purpose set forth.

6. The combination, with the pan A, of the shaft B, provided with arms D and E, the rods D' and E', adjustable in these arms, the shafts F and L, the brush G, and the scoop N, the rods I and O, passing through guide-loops on the shaft B, and the spiral springs K and Q, substantially as herein shown and described, and for the purpose set forth.

7. The combination, with the evaporating-pan A, of the shaft B, provided with arms D and E, the rods D' and E', adjustable in these arms, the brush G, the scoop N, the rods I and O, the guide-loops J and P, the springs K and Q, the cam-plates S, and the blocks R, mounted on the rods O, and provided with projections resting against the edges of the cam-plates S, substantially as herein shown and described, and for the purpose set forth.

8. The combination, with the evaporating-pan A, of the shaft B, provided with arms D and E, the rods D' and E', adjustable in these arms, the brush G, the scoop N, the loops J and P, the springs K and Q, the cam-plates S, the blocks R, provided with projections, and the nut d on the rods O, and the blocks a and b on the rods I, substantially as herein shown and described, and for the purpose set forth.

9. The combination, with the evaporating-pan A, of the shaft B, provided with arms D and E, the rods D' and E', adjustable in these arms, the shaft F, provided with arms H, the brush G, the rods I, and the springs K, substantially as herein shown and described, and for the purpose set forth.

10. The combination, with the evaporating-pan A, of the shaft B, provided with arms E, the rods E', adjustable in these arms, the shaft L, the arms or plates M, the scoop N, the rods O, the springs Q, the cam-plates S, and the blocks R, provided with projections resting on the cam-plates S, substantially as herein shown and described, and for the purpose set forth.

CARL F. W. SCHRAMM.

Witnesses:
OSCAR F. GUNZ,
C. SEDGWICK.